(12) United States Patent
Hjelmvik

(10) Patent No.: US 6,246,338 B1
(45) Date of Patent: Jun. 12, 2001

(54) METHOD OF BILLING FOR PARKING FACILITIES BY MEANS OF PAY METERS

(75) Inventor: Torbernt Hjelmvik, Järfälla (SE)

(73) Assignee: Modul-System Sweden AB

( * ) Notice: Subject to any disclaimer, the term of this patent is extended or adjusted under 35 U.S.C. 154(b) by 0 days.

(21) Appl. No.: 09/142,842

(22) PCT Filed: Mar. 21, 1997

(86) PCT No.: PCT/SE97/00478

§ 371 Date: Sep. 15, 1998

§ 102(e) Date: Sep. 15, 1998

(87) PCT Pub. No.: WO97/35283

PCT Pub. Date: Sep. 25, 1997

(30) Foreign Application Priority Data

Mar. 22, 1996 (SE) .................................................. 9601112

(51) Int. Cl.⁷ .................................................... B60Q 1/48

(52) U.S. Cl. ......................................................... 340/932.2

(58) Field of Search ........................ 340/825.36, 825.49, 340/932.2–933, 286.02; 235/375; 705/418

(56) References Cited

U.S. PATENT DOCUMENTS

| 5,648,906 | * | 7/1997 | Amirpanahi | .......................... 235/375 |
| 5,737,710 | * | 4/1998 | Anthonyson | .............................. 701/1 |

* cited by examiner

Primary Examiner—Daryl Pope
(74) Attorney, Agent, or Firm—Alfred J. Mangels

(57) ABSTRACT

A method of cash card billing with the aid of pay meters when parking a vehicle, using a parking meter system which includes a plurality of meters. The meters include a cash card reader. A person parking a vehicle finds a first meter (BA 1) where the cash card is read and the cash card account (KN) number and the parking commencement time are stored in a memory (BA1 MEM). When terminating the parking period the person finds a second pay meter (BA 2), which stores the card number (KN) together with the perking termination time (UT) in a memory (BA2 MEM). The invention is characterized in that each pay meter includes a keypad (2, 3) by which the person parking the vehicle keys-in the registration number (RN) of the vehicle at the commencement of a parking period in conjunction with reading the cash card, wherein the pay meter stores the registration number (RN) together with the card number (KN) and the parking commencement time (IT); in that the memory (BA1 MEM, BA2 MEM) of each pay meter is connected to the memory of a central computer (7); and in that the cash card account number is billed for the parking period.

15 Claims, 1 Drawing Sheet

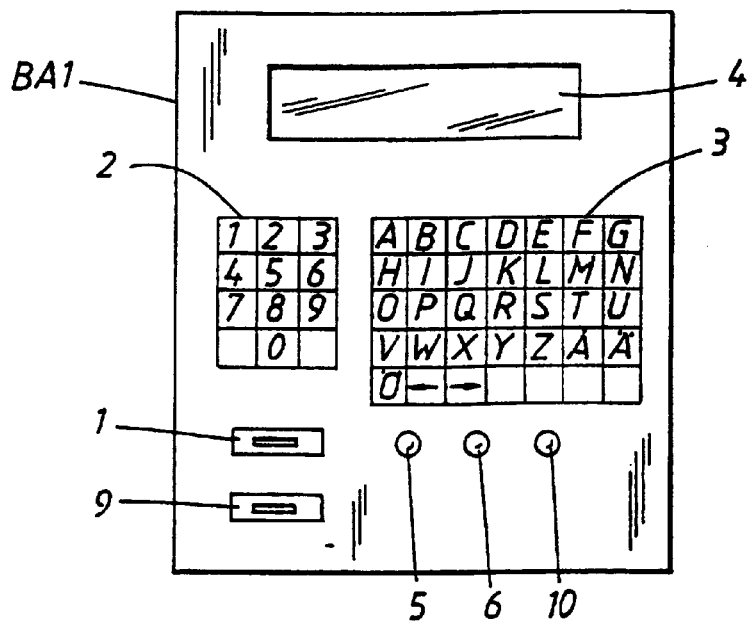
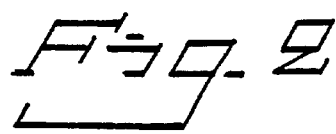
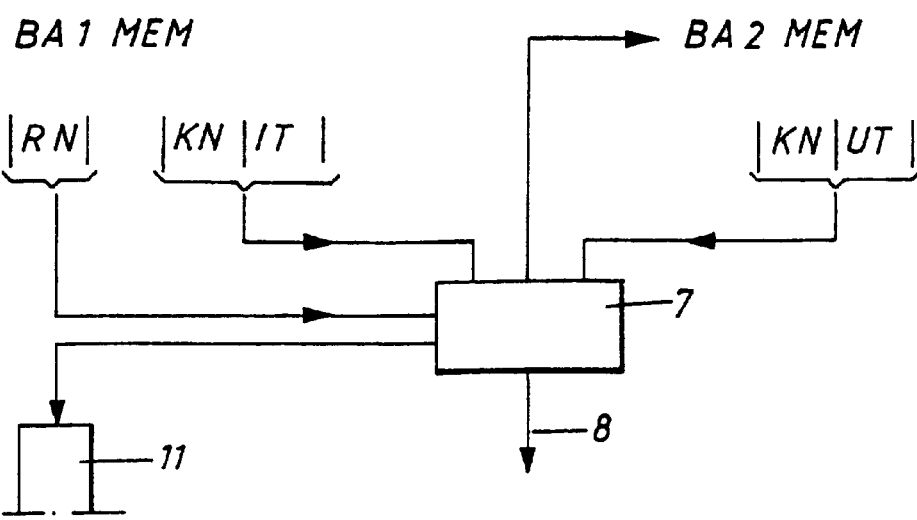

METHOD OF BILLING FOR PARKING FACILITIES BY MEANS OF PAY METERS

BACKGROUND OF THE INVENTION

1. Field of the Invention

The present invention relates to a method of billing vehicle parking by means of pay meters. More specifically, but not exclusively, the invention relates to a method of billing a parking fee to the account number of a cash card, pay card or credit card.

2. Description of the Related Art

In cities, towns and other municipalities, there will be one or more vehicle parking companies that have parking pay meters, distributed through the city or town in a number of different places, where streets, roads and large parking areas are the most common places.

In recent times, it has become possible to pay parking fees with different types of cash cards, credit cards, pay cards, etc. in addition to coin payment. When a cash card is used, the person parking a vehicle will draw his/her cash card through a card reader provided on the pay meter.

The invention relates to that type of payment system in which the person parking a vehicle draws his/her cash card or corresponding card through a card reader in the pay meter, whereupon the meter stores the card account number and the time at which the card was read.

According to one known system, the pay meter issues a parking ticket, which is placed inwardly of the windshield so as to be easily seen. When collecting the vehicle, the person concerned returns to the pay meter and draws his/her card through the card reader. The pay meter then again stores the card number and compares the vehicle collection time with the earlier time at which the card was first drawn through the card reader. The pay meter then calculates the parking fee to be billed and stores this fee together with the number of the card to be billed, and issues a receipt.

One problem with this system is that when collecting the vehicle, it is necessary to return to the same pay meter as that in which the card was read on the parking occasion, in order for the card to be read again on the vehicle collecting occasion. Another problem with this system is that certain parking areas include a large number of pay meters and occasionally drivers forget which pay meter they have used when parking the vehicle. A further problem is that people who park a vehicle several times in a number of different parking places in succession within a limited time period are forced to find the correct pay meter twice on each separate occasion.

It is therefore highly desirable to be able to use any pay meter whatsoever when parking a vehicle and then use any pay meter whatsoever when collecting the vehicle. The only requirement would be that the two pay meters used belong to one and the same vehicle parking company. It would then be possible to commence a series of parking occasions at one place in the city or town and draw the pay card through the card reader of one pay meter and to terminate the series of parking occasions at another place in the city or town, by drawing the pay card through the reader of another meter.

A solution to this problem is disclosed in Swedish Patent 501 845, according to which each pay meter is free-standing and thus not connected to other meters or to a central computer.

This prior patent publication relates to a method of cash card billing with the aid of vehicle parking pay meters, there being provided a pay meter system that includes a plurality of meters each of which constitutes an independent operative unit. Each of the meters includes a card reader. A person parking a vehicle finds a pay meter and draws his/her card through the card reader, therewith entering information relating to at least the cash card account number. The pay meters are constructed to issue a parking ticket at the commencement of the parking period, subsequent to having read the cash card.

The invention according to this earlier patent is characterized in that when the cash card is read by a first pay meter BA1 in conjunction with the commencement of said parking period, the meter is caused to store in its memory BA1 MEM as a first transaction T1, the account number KN, and the time at which the card was read, i.e. the parking commencement time IT, together with a unique transaction number TN. The meter BA1 is caused to issue a parking ticket which displays said transaction number TN in a machine readable form.

When, terminating the parking period, the parking ticket is caused to be read by a second pay meter BA2, which may be any chosen pay meter in the system, including the first pay meter, wherewith the second pay meter BA2 will store the transaction number TN read from the parking ticket together with the time at which the ticket was read, i.e. the parking termination time UT, in a memory BA2 MEM belonging to said second pay meter as a second transaction T2.

The memories of respective first and second pay meters are emptied at certain times, and their contents transferred to the memory of a central computer.

The central computer brings together the respective transactions T1 and T2 recorded in the first and second pay meters BA1 and BA2, with the aid of the transaction numbers TN, and therewith charges the cash card account number KN with a parking cost calculated on the vehicle parking time IT and the parking termination time UT.

One problem with a system of this kind is that a parking ticket that contains machine readable information must be produced in the pay meter, and that each pay meter must have a functional ticket reading reader. Consequently, it is necessary to service the pay meters at relatively short intervals, in order to ensure that this facility is functional. It is also necessary to re-fill the pay meters with parking ticket material.

The handling of parking tickets is also problematic in some respects. If a parking ticket is lost, it is necessary to report the loss in order to be able to terminate parking of the vehicle.

The present invention solves these problems.

SUMMARY OF THE INVENTION

Thus, the present invention relates to a method of cash card billing with the aid of pay meters when parking a vehicle, there being provided a parking meter system which includes a plurality of meters, each constituting an independent operative unit, The meters include a cash card reader, wherein a person parking a vehicle finds a first meter and with the aid of the cash card reader enters cash-card carried information relating to at least the cash card account number, When the cash card is read by the meter the meter, is caused to store the cash card account number and the parking commencement time in a memory that belongs to said first meter, When terminating the parking period the pay card is caused to be read by the card reader of a second pay meter, which may be any chosen meter in the meter system, including the first meter, wherein the second meter is caused to store the card number together with the time at which the pay card was read, the parking termination time, in a memory belonging to said second meter, Each pay meter includes a keypad by means of which the registration number of the vehicle to be parked is keyed-in at the commencement of a parking period in conjunction with causing the cash card to be read, The pay meter is caused to store the vehicle registration number together with the card number and the parking commencement time; the memory of each pay meter is connected to the memory of a central computer; and the cash card account number is billed for the parking period between the parking commencement time and the parking termination time.

BRIEF DESCRIPTION OF THE DRAWINGS

The present invention will now be described with reference to an exemplifying embodiment thereof and also with reference to the accompanying drawing, in which FIG. 1 is a schematic illustration of a pay meter BAI; and FIG. 2 is a flowchart illustrating the invention.

DESCRIPTION OF THE PREFERRED EMBODIMENTS

The present invention relates to a method of cash card billing for parking facilities with the aid of pay meters. A system may include two or more pay meters, all pay meters of which have the same function as or a corresponding function to the first pay meter BA1 shown in FIG. 1.

The pay meter is equipped with a cash card reader 1. The cash card reader may be adapted to read cash cards that include a magnetic strip and cash cards that include a chip. In accordance with the invention, the pay meter comprises a keypad 2, that includes the numbers 0 to 9, and a keypad 3 that includes the letters A to ö. The keypads may also include special character keys, such as hyphen keys, since hyphens are included in the registration numbers of some foreign vehicles. These keys have not been shown in FIG. 1. The keypads may also include arrow keys, for moving a cursor on a pay meter display 4.

The display 4 may conveniently show the relevant date and time.

A person wishing to park his/her vehicle looks for a first pay meter BA1 and with the aid of the card reader of said meter enters cash card information relating to at least the card account number, wherewith the card number KN and the parking commencement time is stored in a memory BA1 MEM of the pay meter, subsequent to having read the cash card.

As before mentioned, each pay meter includes a keypad by means of the person parking the vehicle keys in the vehicle registration number RN at the commencement of the parking period in conjunction with reading of the cash card, wherein the pay meter is caused to store the vehicle registration number RN together with the card number KN and the parking commencement time IT in the memory BA1 MEM.

Subsequent to registering the parking commencement time of a vehicle, i.e., subsequent to the driver of the vehicle having keyed-in his/her vehicle registration number and his/her cash card has been read, the pay meter functions to display instructions as to how the next person to park his/her vehicle shall proceed.

According to one preferred embodiment of the invention, the vehicle registration number (RN) is entered prior to reading the cash card at the commencement of a parking period. Thus, the display asks the person concerned to enter the registration number of the vehicle to be parked. The keyed alphanumerical characters are displayed on the display as the registration number is keyed-in. Keying of the vehicle registration number may conveniently be terminated by pressing a button 5, which denotes that the full registration number has been keyed-in. The display then asks the person to insert his/her cash card into the card reader 1. When this has been done, an indication is given, suitably on the display, to the effect that registration will take place when the person presses a button 5 in acceptance of the registration. This button 5 is suitably the same button as that used to terminate keying of the registration number.

The pay meter includes a cancel button 6 for use when the person concerned changes his/her mind after the cash card has been read. Pressing of the cancel button causes recorded data to be erased.

It is pointed out that no parking ticket or the like is issued that denotes the time at which parking of the vehicle commences.

When parking of the vehicle is terminated, the cash card is read by the card reader of a second pay meter BA2. This second pay meter BA2 may be any chosen pay meter in the pay meter system, including the first pay meter. The pay meter display may present text that asks the person concerned to first enter a vehicle registration number if the vehicle is to be parked, and to insert the cash card into the card reader if parking is to be terminated.

When the pay meter shall be caused to read the cash card in conjunction with terminating parking, the person concerned will suitably acknowledge this by pressing a button 5.

The second pay meter is caused to store the card number KN together with the time at which the card was read, i.e. the parking termination time UT, in a memory BA2 MEM belonging to the second pay meter.

The memories of the pay meters may be of any suitable kind, for instance a RAM memory, a FLASH memory or other semi-conductor memory.

The memory BA1 MEM, BA2 MEM of each pay meter is connected to a central computer and its memory. The pay meters may be connected on-line with the central computer. Alternatively, the contents of the pay meter memories may be collected off-line, through the medium of cables, modems or radio, and therewith transferred to a central computer.

According to the invention, the parking time included from the parking commencement time (IT) to the parking termination time (UT) is billed against the cash card number.

FIG. 2 is a flowchart illustrating said information. Information bits corresponding to vehicle registration number RN, cash card account number KN and parking commencement time IT are stored in the memory BA1 MEM of the pay meter BA1. the information bits KN and the parking termination time UT are present in the memory BA2 MEM of the pay meter BA2.

Billing is effected in the central computer 7 on the basis of KN and IT from BA1 MEM with KN and UT from BA2 MEM. This results in a billing charge 8 against the number of the cash card concerned.

In conjunction with termination of vehicle parking, the central computer 8 will be suitably adapted to send to BA2 the parking fee that will be charged, this fee being displayed on the display 4. The pay meter also includes a printer 9 that prints a receipt in response to pressing a receipt button 10, when a receipt is required.

The cash card number of a person who has forgotten to terminate parking of his/her vehicle will be charged an amount that corresponds to or exceeds the amount chargeable for a maximum permitted parking period.

The invention is primarily aimed at a system of pay meters that are distributed over a wide geographical area. However, the present invention can also be applied beneficially with two or more pay meters that are included in a pay meter system confined within a closed parking area, such as a car parking building, wherein one of the pay meters functions as said central computer.

It will thus be evident that the invention enables a person to use a first pay meter in the system when initially parking his/her vehicle, and another pay meter when terminating parking.

It will also be evident that only one single document need be issued, i.e., a receipt when a receipt is required.

No parking ticket is printed when applying the present invention, and there is therefore no parking ticket that need be placed clearly visible inwardly of the windshield.

In addition, the invention affords the significant advantage of storing the account number of a cash card together with the vehicle registration number, therewith establishing a legal connection between the owner of the cash card and the vehicle in question.

According to one highly preferred embodiment of the invention, the pay meters included in the system are adapted to print out or display at an arbitrarily selected time point and in response to an instruction to this end the registration numbers RN of those vehicles that have commenced a parking period but have not at that point in time terminated parking of their vehicles, This instruction may be delivered in response to the insertion into the card reader of a special authorization card by a parking attendant. The pay meter may be adapted to print out a list 11 (see FIG. 2) of registration numbers in alphabetical order of vehicles that have not terminated parking of their vehicles, in response to this instruction. Alternatively, the registration numbers may be shown on-the display in an alphabetical order, so that the parking attendant is able to scan through the registration numbers with the aid of the arrow keys, for instance.

The parking attendant is then able to compare the registration numbers of parked vehicles with the numbers given by the system. The owner of a vehicle whose registration number is not found in the system is issued with a parking fine.

It will be clearly seen that the drawbacks of known systems discussed in the introduction have been avoided with the present invention.

It will also be understood that the present invention is not restricted to the aforedescribed and illustrated exemplifying embodiments thereof and that modifications can be made within the scope of the following claims.

What is claimed is:

1. A method of cash card billing for the cost of parking with the aid of pay meters when parking a vehicle within a parking meter system that includes a plurality of pay meters, wherein a single pay meter serves a plurality of parking spaces, each pay meter including a cash card reader, a keypad, and a memory, wherein the memory of each pay meter is connected to the memory of a central computer, and wherein no parking ticket is issued at the parking commencement time, said method comprising the steps of:

entering into a pay meter within the parking meter system upon commencement of a parking period a parking customer's cash card account number and a vehicle registration number to identify the vehicle to be parked;

storing the cash card account number, the vehicle registration number, and a parking commencement time in a memory within the pay meter upon commencement of the parking period;

reading the cash card account number by any pay meter within the parking meter system when terminating the parking period;

storing in a memory of the pay meter that has read the cash card account number upon termination of the parking period the card account number and the time at which the card was read upon termination of the parking period to identify a parking termination time;

transferring the contents of the memories of the respective pay meters to the central computer and determining the cost for the parking period corresponding with the cash card account number and the time interval between the parking commencement time and the parking termination time; and billing the cash card account number for the cost for the parking period.

2. A method according to claim 1, wherein the pay meters include a printer, and including the step of delivering to a pay meter within the parking system a printing instruction, and printing the vehicle identification numbers of those vehicles for which a parking commencement time has been recorded and for which a parking termination time has not been recorded.

3. A method according to claim 1, including the step of manually entering the vehicle identification number at the commencement of a parking period.

4. A method according to claim 1, wherein the parking meter system includes at least two pay meters and one pay meter includes the central computer.

5. A method according to claim 1 wherein the pay meter in which the parking commencement time is stored is the same pay meter as the pay meter in which the parking termination time is stored.

6. A method in accordance with claim 1 wherein the pay meter in which the parking commencement time is stored is a different pay meter from the pay meter in which the parking termination time is stored.

7. A method in accordance with claim 1, wherein the vehicle registration number is entered using the keypad of a pay meter.

8. A method in accordance with claim 1, wherein the pay meters include a display panel for displaying information, and including the step of delivering to a pay meter within the parking system a display instruction, and displaying on the display panel of the pay meter to which the display instruction has been delivered the vehicle registration numbers of those vehicles within the parking meter system for which a parking commencement time has been recorded and for which a parking termination time has not been recorded.

9. A method in accordance with claim 3, wherein the vehicle registration number is entered before entering the cash card account number.

10. A method according to claim 1, including the following additional steps:

at a selected check time, identifying the registration numbers of those vehicles that have entered the parking system and have commenced a parking period by entry of a cash card account number and a registration number but have not terminated that parking period by leaving the system;

comparing the registration numbers identified at the check time with registration numbers for vehicles then parked within the system; and issuing a parking fine to vehicles present within the parking system but not identified as having commenced a parking period.

11. A method according to claim 10 wherein the identification step at the selected check time includes printing a list of registration numbers.

12. A method according to claim 10 wherein the identification step includes displaying the registration numbers on a display carried by a pay meter.

13. A method according to claim 11 wherein the list is printed in alphabetical order.

14. A method according to claim 11 wherein the list is displayed in alphabetical order.

15. A method according to claim 1, wherein the parking system includes pay meters located on streets and roads.

* * * * *